Sept. 20, 1932.　　　W. STRELOW　　　1,878,344
DRY GAS METER
Filed Aug. 9, 1930　　　3 Sheets-Sheet 3

Inventor.
Wilhelm Strelow
by　*Dr. Goehrs*
　　Attorney.

Patented Sept. 20, 1932

1,878,344

UNITED STATES PATENT OFFICE

WILHELM STRELOW, OF BERLIN-ZEHLENDORF-WEST, GERMANY

DRY GAS METER

Application filed August 9, 1930, Serial No. 474,240, and in Germany August 17, 1929.

This invention relates to a dry gas meter intended for measuring volumes or amounts of gas or the gas-consumption respectively having two measuring chambers separated from each other in a gas-proof manner by means of a movable intermediate leather or metal diaphragm and change-over valves for the inlet and the outlet of the gas and so designed that the passage of the gas through the said chambers is controlled reciprocally and periodically, as fully described hereinafter.

The characteristic features of the present improved gas meter are the following:

The casing of the meter consists of, or forms, two measuring chambers, separated from one another solely by a valve chamber and a diaphragm; the valve chamber is firmly connected with the inlet channel and the outlet channel of the meter; the diaphragm oscillates, or swings to and fro, in the manner of a pendulum; and the changing-over mechanism for the valves and the counting mechanism are arranged outside the gas chambers below a separate cover.

This arrangement and combinations of parts presents a gas meter of very simple design which is excelled by its mechanical properties, as well as by its measuring capabilities and its perfectly reliable operation.

The separation of the gas chambers by the valve box and the diaphragm permits to survey the apparatus easily, and any damming up of the gas in the same is entirely prevented. By the mechanical connection of the inlet and the outlet branches with the valve chamber so that these members form a self-contained part of the structure, this latter is rendered non-sensitive to exterior influences, and detrimental tensions and leaky places are obviated. The oscillating diaphragm with its simple pendulum suspension presents the advantage that in its end positions when the changing-over of the valves and opening of the same commences a retrograde motion of the diaphragm is initiated by its natural weight so that the changing-over operation proceeds without any additional loss of pressure and without variations of the same. Arranging the changing-over members upon the front side of the gas-proof measuring chambers permits a convenient adjustment and control of the individual parts, as well as accurate gauging of the apparatus, while all changing-over members can be distinctly observed during these operations. After these latter have been carried out, said members can be covered and prevented from access merely by a few fastening screws without any soldered seams.

The invention is illustrated diagrammatically and by way of example on the accompanying drawings, in which Fig. 1 is a front-view of the apparatus, the cover of the casing being removed;

On the drawings, $a$ and $b$ are the two measuring chambers, the outer boundary walls of which are formed by the casing $c$ and the intermediate wall $d$; they are separated from each other by the valve chamber $e$ and the diaphragm $f$, these both parts forming together a second vertical wall.

At the sides of the valve chamber $e$ four apertures are provided formed as valve seats $e^1$, $e^2$, $e^3$, $e^4$ with which the four valve disks $g^1$, $g^2$, $g^3$, $g^4$ cooperate. In the central portion of said chamber $e$ is an intermediate wall $h$ dividing the chamber into two parts, and at the opposite sides are located the inlet branch $i$ and the outlet branch $k$ so that the gas can flow into, and out of, the measuring chambers solely through the alternately opened valves. The chamber $e$ and the branches $i$ and $k$ form a solid self-contained part.

Figure 1:
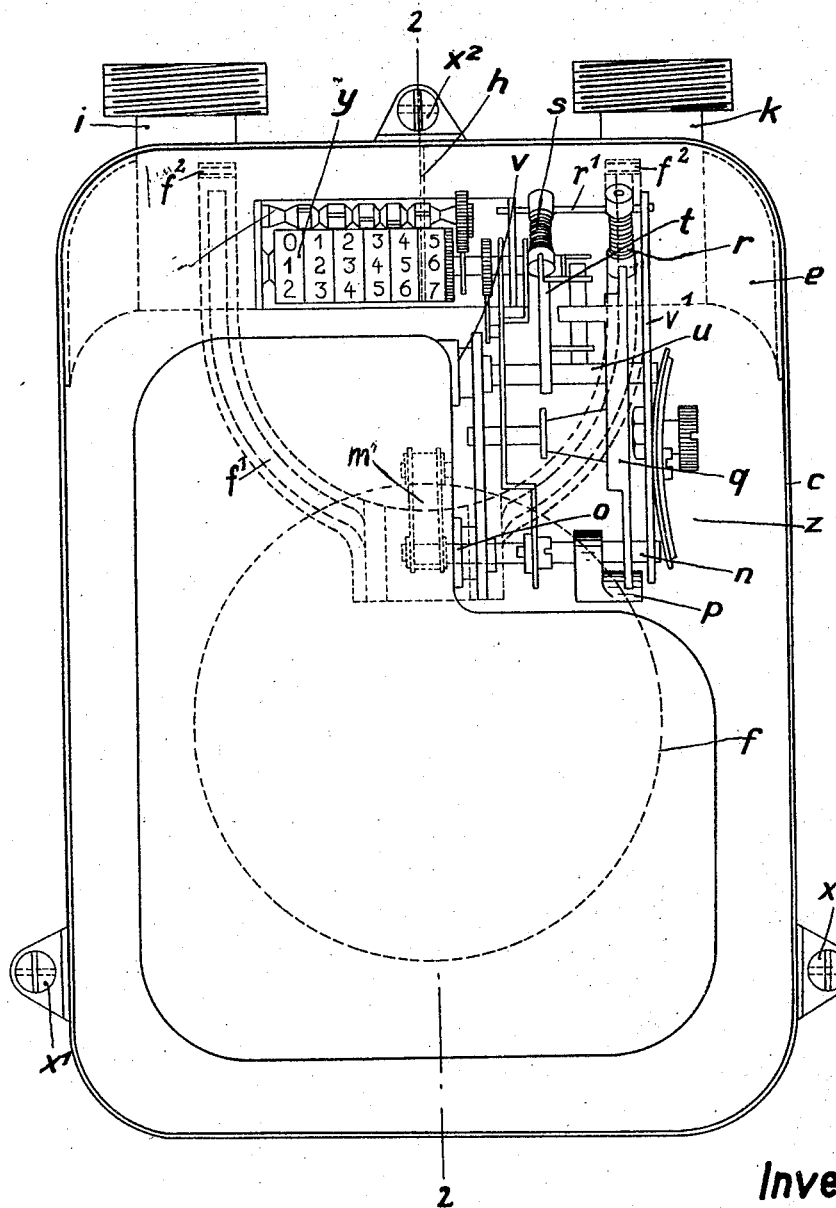
Figure 2:
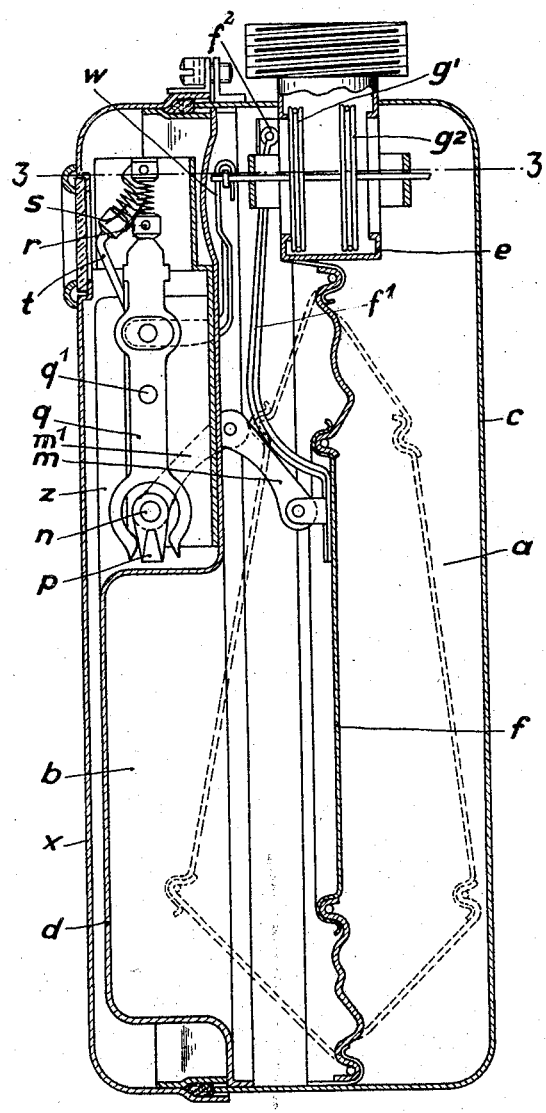
Fig. 2 is a vertical section in the plane 2—2 of Fig. 1.
Figure 3:
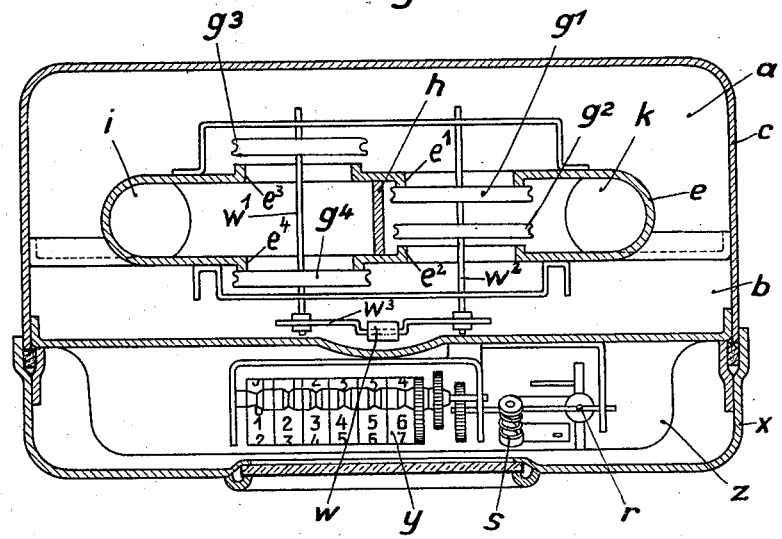
Fig. 3 is a horizontal section in the plane 3—3 of Fig 2, seen in the direction from above to below.
Figure 4:
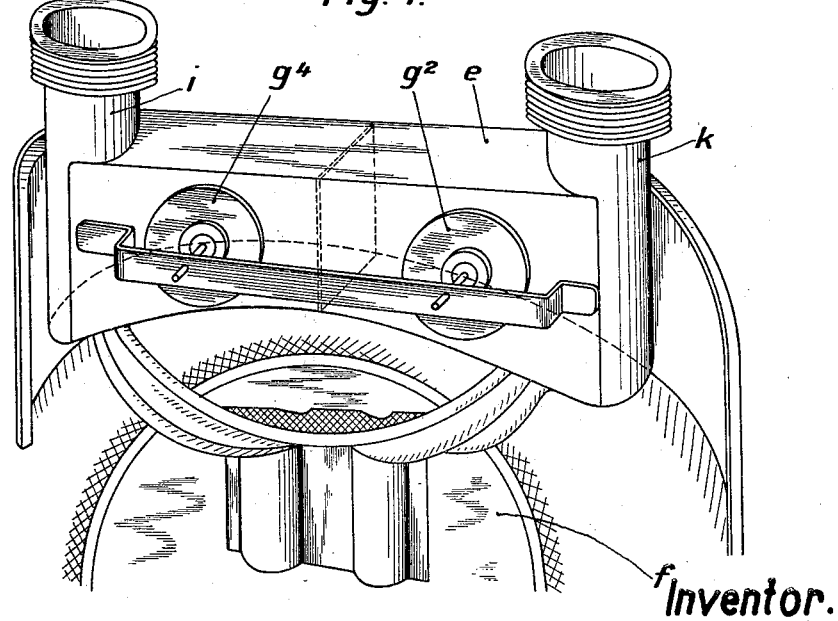
Fig. 4 is a perspective representation of the top portion of the apparatus.

The diaphragm $f$ consists of a middle stiff part preferably of metal and an outer yielding part preferably of leather and is guided by a lever $f^1$ pivotally mounted on the one side wall of the chamber $e$ and having the form of half a circle. By this lever the diaphragm is suspended in the manner of a pendulum; its outmost end positions are indicated by the dotted lines in Fig. 2. The lever $f^1$ is fastened at its one end on the middle part of the diaphragm, while its upper ends are connected with the chamber $e$ by means of pins $f^2$.

On the diaphragm the one arm $m$ of a hinge $m$, $m^1$ is pivoted, the other arm $m^1$ of which is fixed on a shaft $n$ extending through the wall of the chamber $b$ and being tightened by a stuffing box $o$. When the diaphragm oscillates, said axle $n$ therefore is turned by a certain definite angle. On the axle $n$ an eccentric $p$ is fastened which engages the fork-like formed end of a lever $q$ pivoted about a pin $q^1$ and having its free end connected with the one end of a spring $r$, the other end of which being connected with a point of the casing, for instance by being pivotally connected with a rod $r^1$ fixed on the casing. This spring $r$ is a tipping-over spring. In the central position shown in Fig. 2 the spring is under its greatest tension and when the diaphragm moves into the one or the other of its end positions, the spring that had been put under tension prior thereto is released and expands, thereby turning the lever $q$. The lever $q$ effects before coming into its end positions a turning of a further lever $t$ fixed on an axle $u$ journalled in the wall of the chamber $b$ and in the wall $v^1$. The free end of the lever $t$ is in a similar way as the lever $q$ connected with the one end of a tipping-over spring $s$, the other end of which is pivoted on the rod $r^1$. The spring $s$ is weaker than the spring $r$ and therefore may be tended by the latter so as to tip over, thereby swinging the lever $t$ and turning the axle $u$ to the one or the other of its end positions. The axle $u$ extends through the wall of the gas chamber $b$ and is tightened by a stuffing box $v$. Within the gas chamber the axle $u$ is connected with the changing-over bow $w$ for the valves. These latter are fixed on two rods $w^1$ and $w^2$ respectively, and these rods are fastened on a cross-bar $w^3$ which is engaged by the bow $w$. Thus, the valves are changed over by the tipping-over spring $r$ at the end of every oscillation of the diaphragm.

The cover $x$ is connected with the casing by the screws $x^1$, $x^2$, $x^3$, and the change-over members for the valves lie, thus, in the chamber $z$ which is devoid of gas.

The gas meter operates in this manner that the gas which is kept under a certain service pressure is conducted through the inlet branch $i$ and through the valves opened at that time into one of the measuring chambers $a$ or $b$ whereby the diaphragm $f$ is caused to give way, whereas by this movement the gas is driven out of the other measuring chamber through the outlet branch $k$ into that pipe through which the gas is conducted to the places of use, the pressure suffering a certain small reduction, which is proportional to the passage of the gas through the meter.

Conducting the gas alternately into the one measuring chamber or the other is effected by the sudden changing-over of the valves which takes place just in that moment in which the inlet chamber is filled with the gas and the outlet chamber is practically devoid of the same, that changing-over being effected by the reciprocating diaphragm $f$ subjecting, by the described lever transmission, the spring $s$ to tension, this spring being released when the diaphragm has arrived in the one or the other of its end positions when the lever $w$ connected with the valve disks will be turned from its one end position into the other end position, thereby changing over the valves.

The movements of the diaphragm are transmitted to the counting mechanism $y$ of the gas meter in any known manner, or by any known members respectively, such as levers, ratchet wheels, or the like, in such a way, that the gas consumption is indicated in cubic meters. The described means for operating the valves and the counting mechanism are arranged on the wall $d$ and outside the measuring chambers, as clearly shown in Fig. 2 of the drawings and the wall $d$ is bent over or offset, so as to form a space of sufficient size allowing the swinging of the diaphragm.

I claim:—

1. A valve controlled dry gas meter having two measuring chambers and comprising in combination with a casing, a valve chamber, a valve mechanism within said chamber, an inlet branch and an outlet branch combined with said valve chamber, a diaphragm connected with said valve chamber, so as to swing like a pendulum, said valve chamber and diaphragm forming together a vertical wall arranged within said casing and separating two measuring chambers from each other; a second vertical wall arranged within said casing and forming the outer boundary wall of one of said measuring chambers, valve operating means and a counting mechanism both being mounted on said second wall and outside of said measuring chambers, and means operatively connecting said valve operating means with said diaphragm and means operatively connecting said valve operating means with said counting mechanism, said second named means having a portion extending gas-tight through said second wall.

2. A valve controlled dry gas meter as claimed in claim 1 in combination with means pivotally connecting said valve chamber and said diaphragm.

3. A valve controlled dry gas meter as claimed in claim 1 in combination with means pivotally connecting said valve chamber and said diaphragm, said second wall being bent, so as to form a space sufficient to allow the swinging of the diaphragm.

In testimony whereof I have affixed my signature.

WILHELM STRELOW.